United States Patent [19]

Hashimoto et al.

[11] Patent Number: 5,379,093
[45] Date of Patent: Jan. 3, 1995

[54] IMAGE PROCESSING MACHINE CAPABLE OF INHIBITING COPYING OF VALUABLE PAPERS

[75] Inventors: Hideyuki Hashimoto, Toyokawa; Munehiro Nakatani, Toyohashi; Hideo Kumashiro, Toyokawa, all of Japan

[73] Assignee: Minolta Camera Kabushiki Kaisha, Osaka, Japan

[21] Appl. No.: 142,826

[22] Filed: Oct. 25, 1993

[30] Foreign Application Priority Data

Oct. 31, 1992 [JP] Japan ................................. 4-316546

[51] Int. Cl.$^6$ .............................................. G03G 15/00
[52] U.S. Cl. ........................................ 355/201; 382/7; 382/16; 355/326 R
[58] Field of Search ................. 355/201, 133; 382/7, 382/17, 62, 16

[56] References Cited

U.S. PATENT DOCUMENTS 5,216,724  6/1993  Suzuki et al. ..................... 382/7

FOREIGN PATENT DOCUMENTS

| | | | |
|---|---|---|---|
| 55-36873 | 3/1980 | Japan | ................. 355/201 |
| 64-61777 | 3/1989 | Japan | . |
| 1-285977 | 11/1989 | Japan | ................. 355/201 |
| 1-316782 | 12/1989 | Japan | ................. 355/201 |
| 1-316783 | 12/1989 | Japan | ................. 355/201 |

OTHER PUBLICATIONS

*Patent Abstracts of Japan*, vol. 14, No. 504, P 1127, for Doc. No. 02-210481, Pub. Dt. Aug. 21, 1990.
*Patent Abstracts of Japan*, vol. 14, No. 438, P 1108, for Doc. No. 02-171790, Doc. Pub. Dt. Jul. 3, 1990.
*Patent Abstracts of Japan*, vol. 14, No. 438, P 1108, for Doc. No. 02-171780, Doc. Publ. Dt. Jul. 3, 1990.
*Patent Abstracts of Japan*, vol. 13, No. 269, P 888, for Doc. No. 01-61777, Doc. Pub. Dt. Mar. 8, 1989.
*Patent Abstracts of Japan*, vol. 14, No. 64, P 1002, for Doc. No. 01-285978, Doc. Pub. Dt. Nov. 16, 1989.

*Primary Examiner*—R. L. Moses
*Attorney, Agent, or Firm*—Willian Brinks Hofer Gilson & Lione

[57] ABSTRACT

An image processing machine having an electrophotographically making copies of one or more originals. This image processing machine is designed to inhibit the electrophotographic copying function in the event that one attempts to make a copy of valuable papers such as monetary papers or securities and comprises a detecting unit for detecting a spatial frequency of a small region of an original to be copied, a calculating unit for comparing the detected spatial frequency with a standard spatial frequency used as a standard pattern, thereby to calculate the degree of similarity therebetween, a judging unit for judging whether or not the degree of similarity so calculated is greater than a predetermined value, and a determining unit for determining, when the judging unit indicates the degree of similarity greater than the predetermined value, that the original to be copied is identical with an original used as a basis for the standard pattern.

4 Claims, 11 Drawing Sheets

Fig.9(e)  min. $|n_i - N_j|$  ($i = 1, 2, \cdots k$)

$(i = 1, 2, \cdots 9)$ min. $|k - M_j|$  (N = Freq, M = Peak Number)

IMAGE PROCESSING MACHINE CAPABLE OF INHIBITING COPYING OF VALUABLE PAPERS

BACKGROUND OF THE INVENTION

1. Field of the Invention

The present invention generally relates to an electrophotographic image processing machine such as, for example, an electrophotographic color copying machine, and more particularly to the electrophotographic image processing machine equipped with means for avoiding forgery of valuable papers such as monetary papers and securities.

2. Description of the Prior Art

The Japanese Laid-open Patent Publication No. 2-210591 discloses an image processing machine having a capability of avoiding forgery of monetary papers. According to this prior art image processing machine, detection is made of an image pattern by detecting the position of the original, followed by comparison of the detected image patter with a standard pattern stored in the system to determine the similarity. This prior art image processing machine determines the nature of the original, i.e., whether or not the original is a monetary paper, according to the degree of similarity. Specifically, In this prior art image processing machine, a pattern matching technique is employed to compare the seal (the Seal of the Governor of the Bank of Japan) imprinted on the monetary paper with that stored in a memory.

The Japanese Laid-open Patent Publication 64-61777 discloses a copying machine having a capability of disabling a copying function that works out when one attempts to make a copy of the monetary paper. This publication describes that, when an image date read out matches with a predetermined density or pattern, the copying function is disabled, but has failed to disclose a specific verification method.

The image processing machine disclosed in the first mentioned publication is satisfactory in that, when the valuable paper such as, for example, the monetary paper is placed on a document support of the machine, the presence of the valuable paper can be recognized to avoid forgery. However, in the event that the monetary paper is placed on the document support with a portion thereof concealed or separated pieces of the monetary paper are placed on the document support, there is no way to avoid forgery.

On the other hand, the second mentioned publication disclose no specific verification method as mentioned above. In other word, no disclosure is made in this second mentioned publication as to how verification can be correctly and with no error made from a portion of the original, and therefore, it appears difficult to accurately determine the nature of the original placed on the document support, that is, whether or not it is a monetary paper.

SUMMARY OF THE INVENTION

In view of the foregoing, the present invention has been devised to provide an improved image processing machine having a capability of avoiding forgery of valuable papers such as monetary papers and securities, which machine is effective to avoid the forgery even though the valuable paper is placed on the document support with a portion thereof concealed or separated pieces of the valuable paper are separately placed on the document support.

In order to accomplish the foregoing object, the present invention provides an image processing machine which comprises detecting means for detecting a spatial frequency of a small region of an original to be copied, calculating means for comparing the detected spatial frequency with a standard spatial frequency used as a standard pattern, thereby to calculate the degree of similarity therebetween, judging means for judging whether or not the degree of similarity so calculated is greater than a predetermined value, and determining means for determining, when the judging means indicates the degree of similarity greater than the predetermined value, that the original to be copied is identical with an original used as a basis for the standard pattern.

According to the present invention, the detecting means detects the spatial frequency of that particular area of the original. The spatial frequency so detected is compared with the standard spatial frequency used as a standard pattern to calculate the degree of similarity. Only when the degree of similarity so calculated is indicated greater than a predetermined value the determining means determines whether or not that the original to be copied is a monetary paper.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

First Embodiment (FIGS. 1 TO 9)

As will be detailed subsequently, with an electrophotographic copying machine according to a first preferred embodiment of the present invention, during a first scanning for making a print in cyan (C) color, a pattern of distribution of a spatial frequency of a green (G) component of an original to be copied is compared with a standard pattern of distribution of a spatial frequency to calculate the degree of similarity. Similarly, during a second scanning for making a print in magenta (M) color, a pattern of distribution of a spatial frequency of a blue (B) component of the original is compared with a standard pattern of distribution of a spatial frequency to calculate the degree of similarity. Again, during a third scanning for making a print in yellow (Y) color, and in the event that the degree of similarity calculated during each of the first and second scanning is determined high, verification is made to determine if the original contains a vermilion-colored pattern having a curvature equal to that of the seal imprinted on a monetary paper. Where it is verified that the original contains the vermilion-colored pattern having a curvature equal to that of the seal on the monetary paper, a blackening process takes place, during a fourth scanning for making a print in black (Bk) color, to make a solid black print in which the entire surface of the print is printed solid black. The foregoing sequence of operation is shown in a timing chart of FIG. 2.

[1-1] Machine Structure

Figure 1:
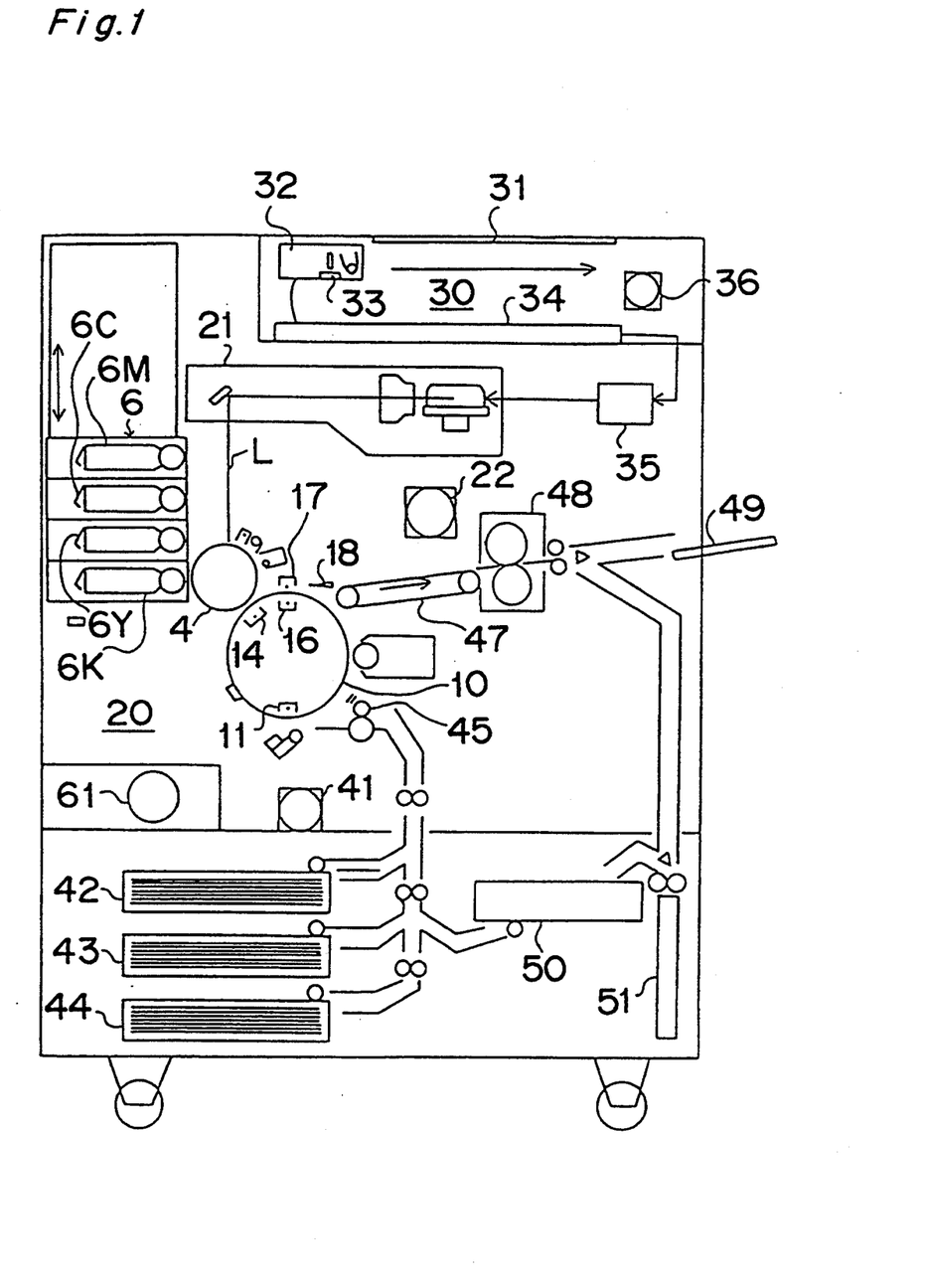
FIG. 1 is a schematic side sectional view of an electrophotographic copying machine to which the present invention is applicable.
Figure 2:
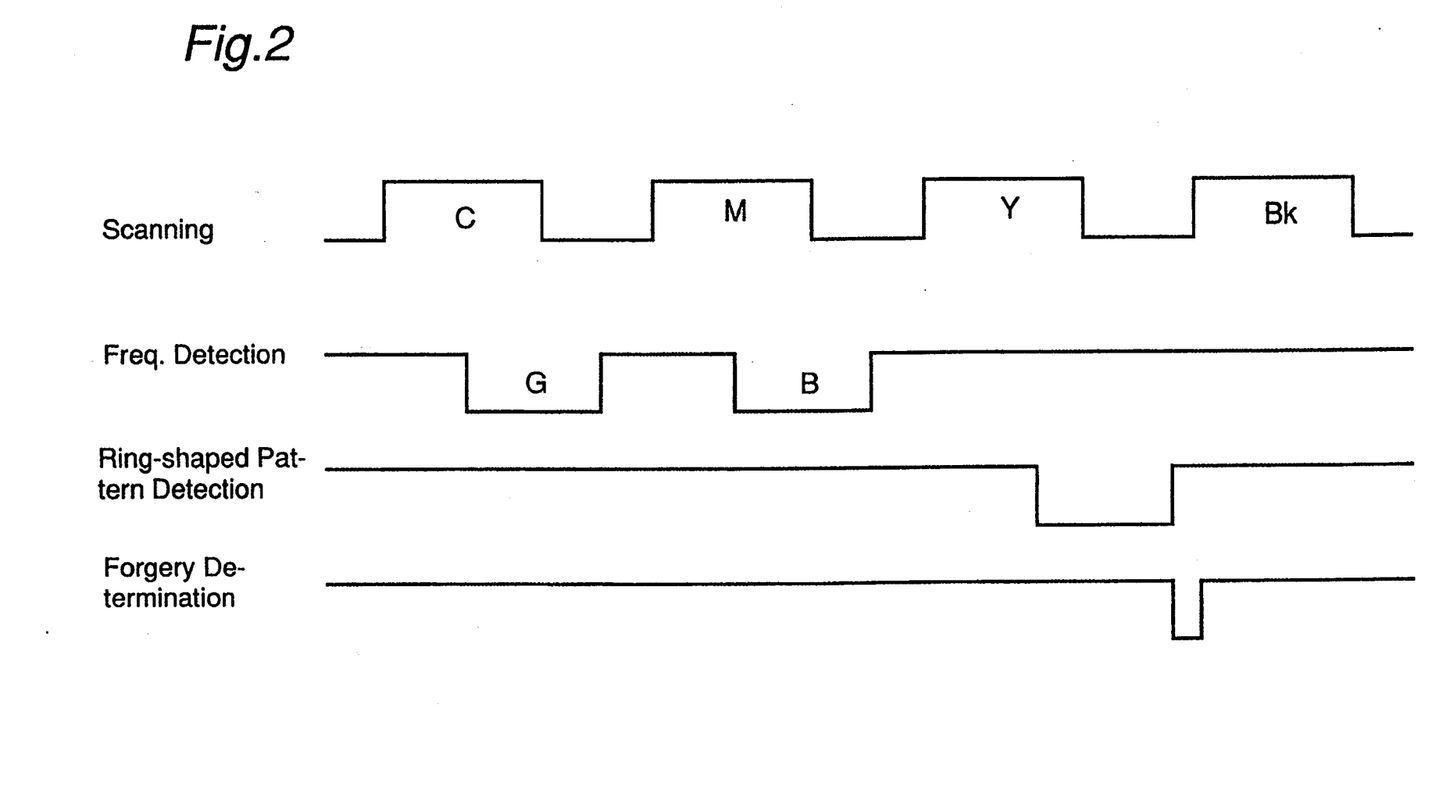
FIG. 2 is a timing chart showing the timing of forgery determination relative to an image processing performed in the copying machine shown in FIG. 1.

The structure of the electrophotographic copying machine will schematically be described with particular reference to FIG. 1. This machine broadly comprises an image reading unit (image reader) 30 and an image recording unit (image printer) 20. It is to be noted that the illustrated copying machine is equally applicable to the practice of not only the first preferred embodiment of the present invention but also a second preferred embodiment of the present invention which will be described later.

The image reading unit 30 is so structured and so designed as to provide an electric signal consequent upon reading of an image of the original to be copied, which signal is subsequently utilized to produce an image data for driving a laser diode.

More specifically, the document placed on a transparent document support, i.e., a transparent glass platen 31, with an image face oriented downwardly is scanned by a scanner 32 to illuminate the original image. Imagewise rays of light reflected from the original are transmitted to an image sensor (CCD) 33 (identified by 341, 342 and 343 in FIG. 3) carried by the scanner 32 and are then converted by the image sensor 33 into an electric signal corresponding to the original image. The electric signal outputted from the image sensor 33 is then supplied to an image signal processing unit 34 and is, after having received a predetermined processing in the image signal processing unit 34, subsequently utilized as an image date for driving the laser diode. This image data is supplied to a print head control 35. It is to be noted that the scanner 32 is driven by the drive of a stepping motor 36 when it scans.

In the image recording unit 20, an electrostatic latent image formed on a photoreceptor drum 4 by exposure to an imagewise laser beam L is successively developed into powder images of different colors (cyan C, magenta M, yellow Y and black Bk) which are subsequently transferred successively onto a copying paper turned around a transfer drum 10. The powder images transferred onto the copying paper are then supplied through a thermal fixing unit 48 by which the powder images are permanently fixed thereon while having been fused to give a color tone identical with that of the original image. However, in the event that the original being copied is determined one of documents which should be dismissed from being copied such as, for example, monetary papers and securities (those documents being hereinafter referred to as contraband documents), an solid black image, not an image of the original, is written on the photoreceptor drum by means of an imagewise laser beam L during the formation of an electrostatic latent image to be developed with black toner.

The details of the image recording unit 20 will now be described. A laser device 21 controlled by the print head control 35 outputs the imagewise laser beam B which subsequently impinge upon the photoreceptor drum 4, then driven in one predetermined direction at a predetermined peripheral velocity, while simultaneously guided by an optical system within the laser device 21 so as to sweep the photoreceptor drum 4 in a direction lengthwise thereof and parallel to the axis of rotation of the photoreceptor drum 4. As a result thereof, an electrostatic latent image is formed on the photoreceptor drum 4 in correspondence with the image of the original. As a matter of course, prior to the formation of the electrostatic latent image, the photoreceptor drum 4 has its outer peripheral surface uniformly charged to a predetermined potential at a location upstream of the site of incidence of the imagewise laser beam L with respect to the direction of rotation of the photoreceptor drum 4.

The electrostatic latent image formed on the photoreceptor drum 4 in any known manner is, during the continued rotation of the photoreceptor drum 4, developed into a visible powder image by one of developing units (indicated by 6M for cyan toner, 6M for magenta toner, 6Y for yellow toner and 6K for black toner) all included in a developer assembly 6. In practice, one of the developing units 6C, 6M, 6Y and 6K are selectively brought in position to apply the appropriate toner, that is, to a developing station by the drive of a developer drive motor 61.

The visible powder image so developed are transferred at a transfer station onto the copying paper, turned around the transfer drum 10, by the effect of an electrostatic force of attraction developed by a transfer charger 14. Prior to the transfer of the visible powder image onto the copying paper, the copying paper is supplied either from one of a plurality of paper trays 42, 43 and 44 or from an intermediate tray 50 to a timing roller pair 45 by means of juxtaposed guide roller pairs and is then turned around the transfer drum 10 for transportation to the transfer station in synchronism with the arrival of the visible powder image on the photoreceptor drum 4 at such transfer station.

Reference numeral 11 represents a suction charger for drawing the copying paper onto the transfer drum 4 for transportation thereof towards the transfer station; reference numerals 16 and 17 represent an eraser for removal of the electrostatic charge from the copying paper; and reference numeral 18 represents a separator pawl for separating the copying paper from the transfer drum 10. As a matter of course, the photoreceptor drum 4 and the transfer drum 10 are driven by a common drum drive motor 22 in synchronism with each other, that is, at an equal peripheral velocity.

The copying paper onto which the visible powder images in maximum four colors (applicable in the case of a full color original image) have been transferred is peeled off from the transfer drum 10 and is conveyed by means of a transport belt system 47 towards the fixing unit 48 by which the visible powder images are permanently fixed thereon while having been fused to give a color tone identical with that of the original image. Thereafter, the copying paper bearing the color image that is a replica of the original image is either ejected onto the paper recovery tray 49 or returned to the intermediate tray 50. It is to be noted that, if the copying paper being returned to the intermediate tray 50 is switched backwards by an inverting unit 51 prior to the arrival thereof at the intermediate tray 50, the same copying paper will be again transported to the transfer drum 10 having been turned upside down so that another image can be copied on a reverse side of the copying paper. It is also to be noted that the guide roller pairs, the transport belt system 47 and others are driven by a common main motor 41.

[1-2] Image Signal Processing

The image signal processing will now be described with particular reference to FIGS. 3 to 9. CCD (R) 341, CCD (G) 342 and CCD (B) 343 each having a red, green or blue spectral sensitivity characteristic output respective 8-bit quantitized signals representative of digits of 0 to 225. These signals are, after having been converted into respective density signals by associated logarithmic converters 344, 345 and 346, subjected to a masking and a removal of ground color in a UCR circuit 347 and are then successively converted into a cyan (C) signal during the first scanning, a magenta (M) signal during a second scanning, a yellow (Y) signal during the third scanning and a black (Bk) signal during the fourth scanning, all of these color signals being subsequently outputted to a data selector 348 in a predetermined bit length. It is to be noted that each of the first to fourth scanning operation is set by a Setting 1 process (S11), a Setting 2 process (S14) and a Setting 3 process (S17). The data selector 348 is usually operable to output the various image date referred to above to the print head control 35 shown in FIG. 1.

Figure 3:
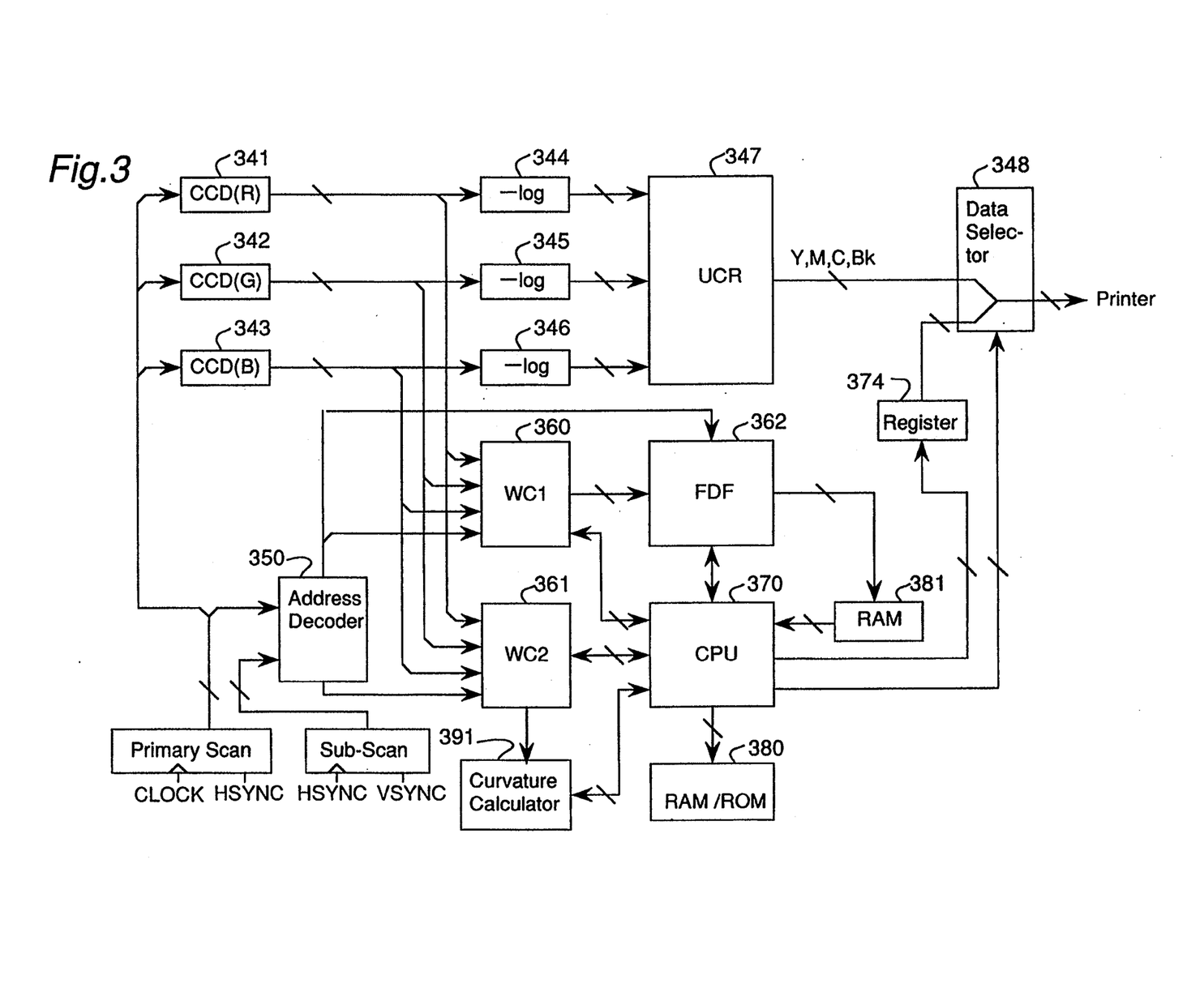
FIG. 3 is a circuit block diagram showing the details of an image signal processing unit in the copying machine.

The respective signals outputted from CCD (R) 341, CCD (G) 342 and CCD (B) 343 are also inputted to an window comparator 360 during each of the first and second scanning (S12 and S15). This window comparator 360 is operable to extract an image date of a specific color designated by a central processing (CPU) 370 and then to supply the image data of the specific color to a frequency detecting function block (FDF) 362. It is to be noted that the date concerning the specific data is stored in a read-only memory (ROM) 380.

Figure 4:
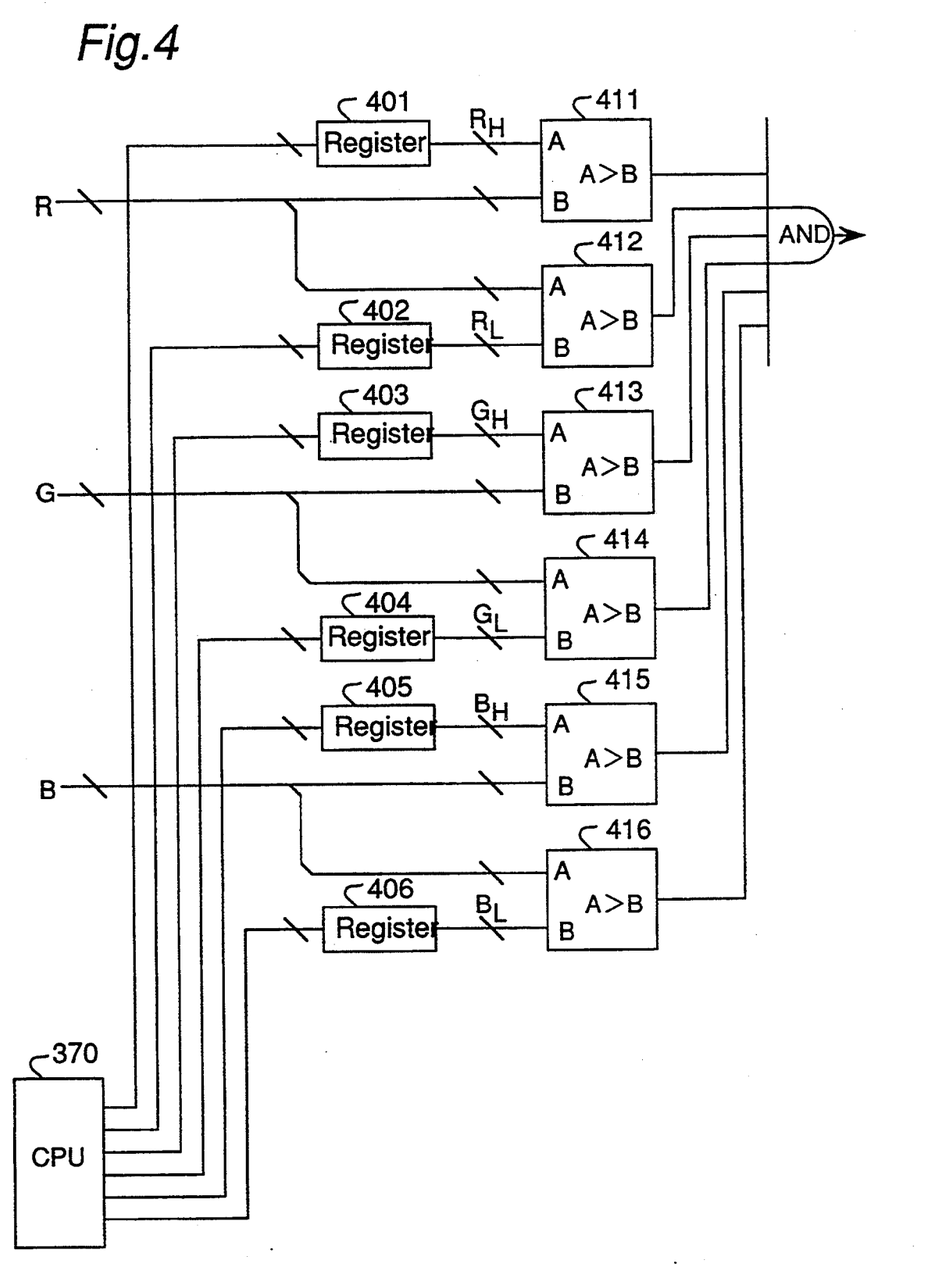
FIG. 4 is a circuit block diagram showing the details of a window comparator.

The details of the window comparator 360 referred to above are best shogun in FIG. 4. Various data used to designate the specific color are written in respective registers 401 to 406 by the central processing unit 370. For example, the register 401 has written therein a data $R_H$ defining the upper limit of the R component. This data $R_H$ is utilized by a comparator 411 to compare the R data supplied from CCD (R) 341 with it, which comparator 411 outputs a logic high "1" signal if $R_H$. R (A>B). The register 402 has written therein a data $R_L$ defining the lower limit of the R component. This data $R_L$ is utilized by a comparator 412 to compare the R data supplied from CCD (R) 341 with it, which comparator 412 outputs a logic high "1" signal if $R > R_L$ (A>B). Accordingly, only when $R_H > R > R_L$, both comparators 411 and 412 output a logic high "1" signal.

Similarly, the registers 403 and 404 have written therein data $G_H$ and $G_L$ defining the upper and lower limits of the G component, respectively. Therefore, both comparators 413 and 414 output a logic high "1" signal when $G_H > G > G_L$.

Again similarly, the registers 405 and 406 have written therein data B defining the upper and lower limits of the B component, respectively, and therefore, both comparators 415 and 416 output a logic high "1" signal when $B_H > B > B_L$.

These comparators 411 to 416 are connected to respective inputs of a logic AND gate AND which outputs a logic high "1" signal when $R_H > R > RL$, $G_H > G > G_L$ and $B_H > B > B_L$. In this way, the specific color is extracted from the window comparator 360.

Figure 5:
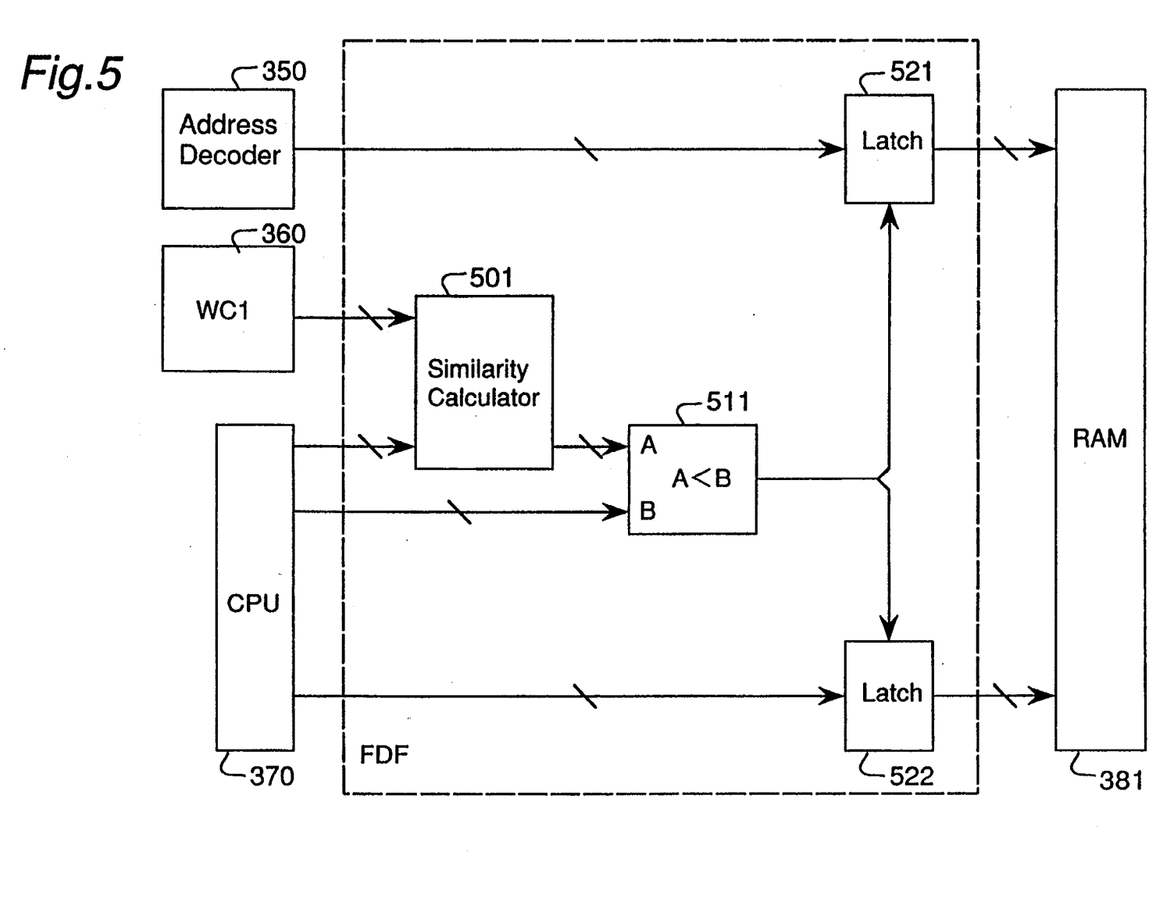
FIG. 5 is a circuit block diagram showing the details of FDF.

The image date of the specific color extracted by the window comparator 360 in the manner described above is supplied to the frequency detecting function block (FDF) 362. In this FDF 362, a small area (16-pixel area) specified by an address decoder 350 is compared with one of nine specific patterns stored in the read-only memory 380 to calculate the degree of similarity. Where a high degree of similarity is indicated, the type of the specific pattern that has given the highest degree of similarity and the position of the small area that has given the highest degree of similarity are written in a random access memory 381.

Figure 7:
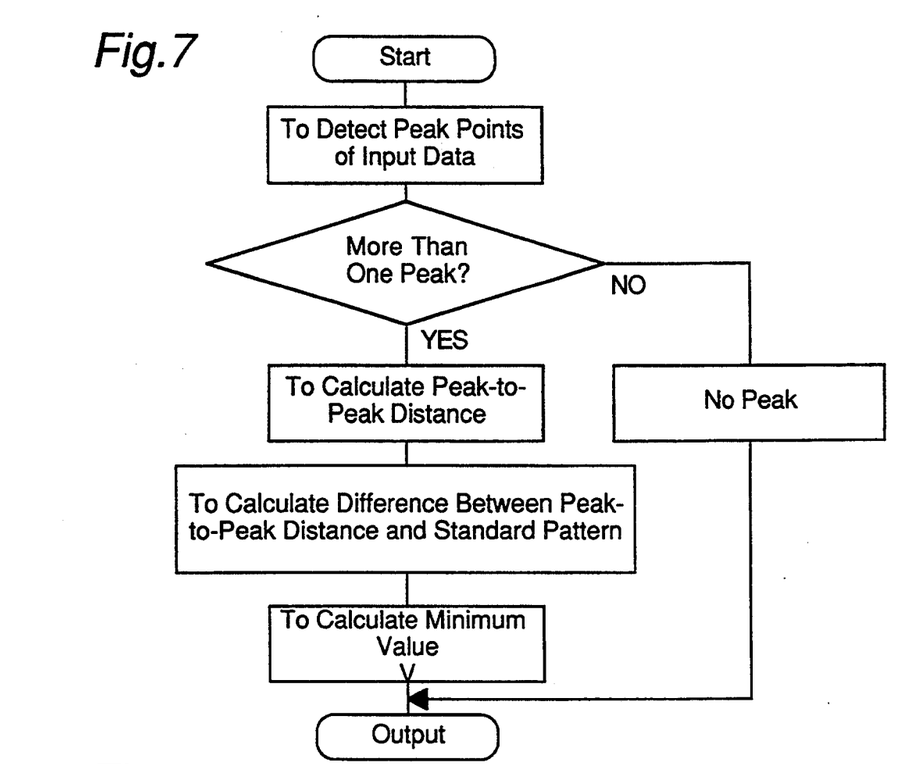
FIG. 7 is a flowchart showing the sequence of operation taking place in a similarity calculating unit.
Figure 8:
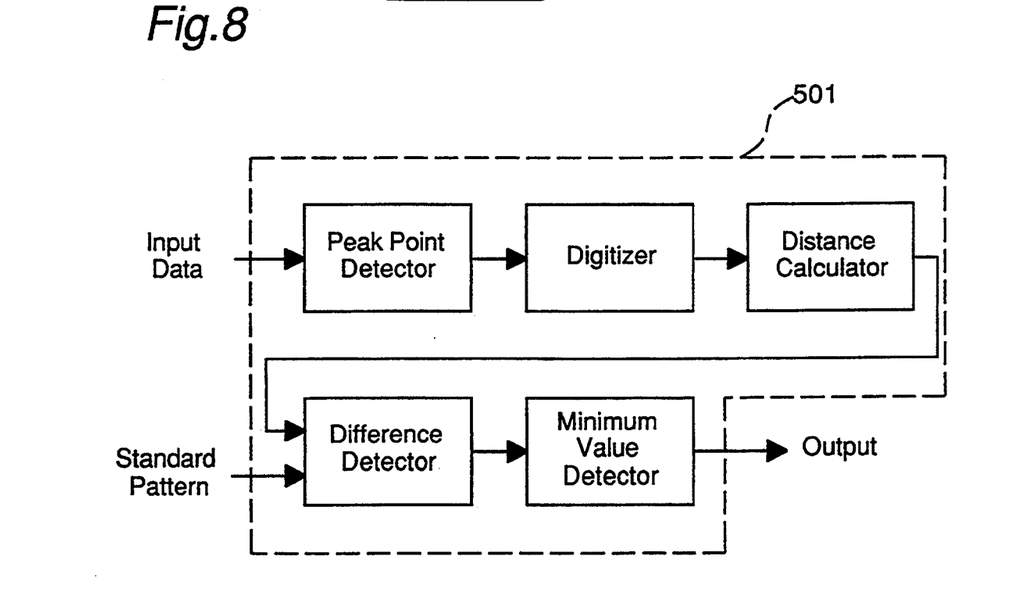
FIG. 8 is a circuit block diagram showing a processing function performed in the similarity calculating unit.

FIG. 5 illustrates the details of FDF 362 while FIGS. 7 to 9 illustrates the processing that takes place in a similarity calculating unit 501 included in FDF 362. The degree of similarity is calculated for each 16-pixel area.

In the first place, peak points of the image data of the specific color extracted by the window comparator 360 in the manner described above are detected (as shogun in FIG. 9(a)). The peak point referred to above means one of three consecutive pixels which is positioned intermediate between the remaining pixels if the remaining pixels has a density lower than that of the intermediate pixel.

Figure 9A:
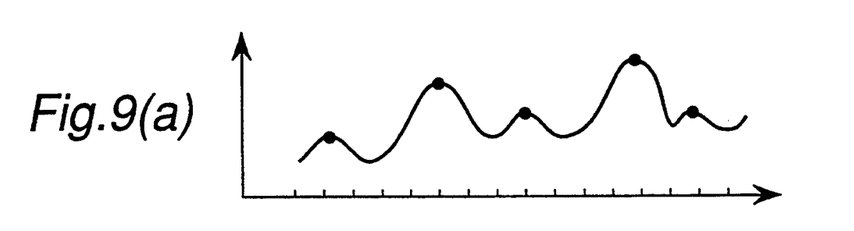
FIGS. 9(a) to 9(e) are diagrams which sequentially illustrate how the degree of similarity is calculated.
Figure 9B:
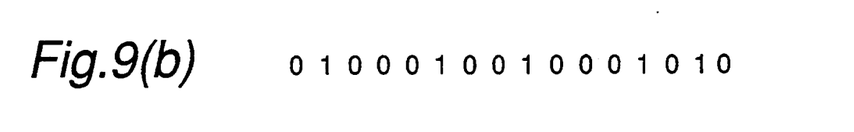
Figure 9C:
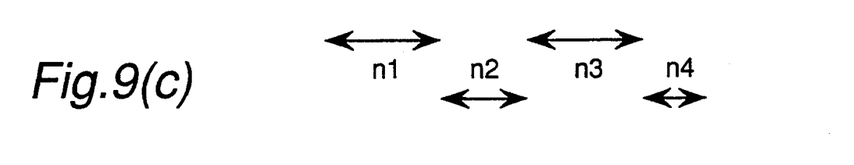
Figure 9D:
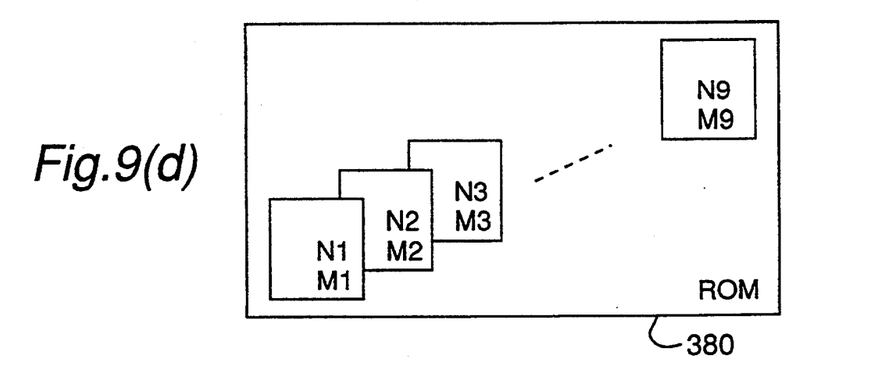

Subsequently, the peak points so detected and nonpeak points are digitized by a digitizing circuit into "1" and "0", respectively (as shown in FIG. 9(b)).

Where there is a plurality of peak points, the distance of spacing between the neighboring peak points, that is, the number of pixels existing among the peak points, is calculated. In FIG. 9(c), the distances of spacing referred to above is indicated by $n_1, n_2, \ldots, n_i, \ldots$ and $n_{k-1}$ (k representing the number of the peaks).

The calculated distance of spacing ni between the peak points is compared with the distance of spacing Nj (j representing the number of each standard pattern) of one of the standard patterns (nine standard patterns corresponding to respective angle of inclination of 0°, 10°, ... 70° and 80° of a monetary paper at which the spatial frequency of the pattern of the monetary paper or the original would be set in an inclined fashion, which standard patterns are stored in the read-only memory 380. See FIG. 9(d).) to determine the difference therebetween and a minimum value is then calculated (See FIG. 9(e).)

Also, the number k of the peak points calculates is compared with the number Mj of the peak points in each standard pattern to determine the difference therebetween and, in a manner similar to that described above, a minimum value thereof is then calculated. (See FIG. 9(e).)

Figure 9E:
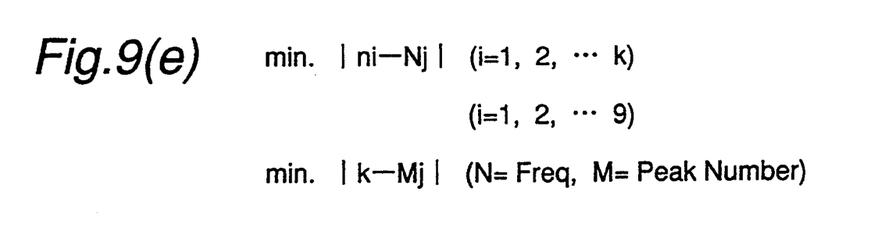

It is to be noted that that the minimum value is small means that the degree of matching between the spatial frequency of the original and that of the monetary paper is highest, that is, the degree of similarity is high.

Each minimum value calculated in this way is supplied to a comparator 511 shown in FIG. 5 and is then compared with a predetermined threshold value given by the central processing unit 370. Where the minimum value is smaller than the threshold value, the comparator 511 indicates that the degree of similarity is high and, then, a latch 521 is latched with an address data indicative of the position of such small area which is subsequently written in the random access memory 381. At the same time, the type (set angle) of the relevant standard pattern is latched in a latch 522 and is subsequently written in the random access memory 381. It is to be noted that the threshold value referred to above is stored in the read-only memory 380.

Calculation of the degree of similarity and determination of whether or not the degree of similarity is high are carried out in the manner described hereinabove and, in the event of the high degree of similarity, the data indicative of the position of the relevant small area and the data indicative of the type of the relevant standard pattern associated with the high degree of similarity are stored (S13, S16).

Figure 6:
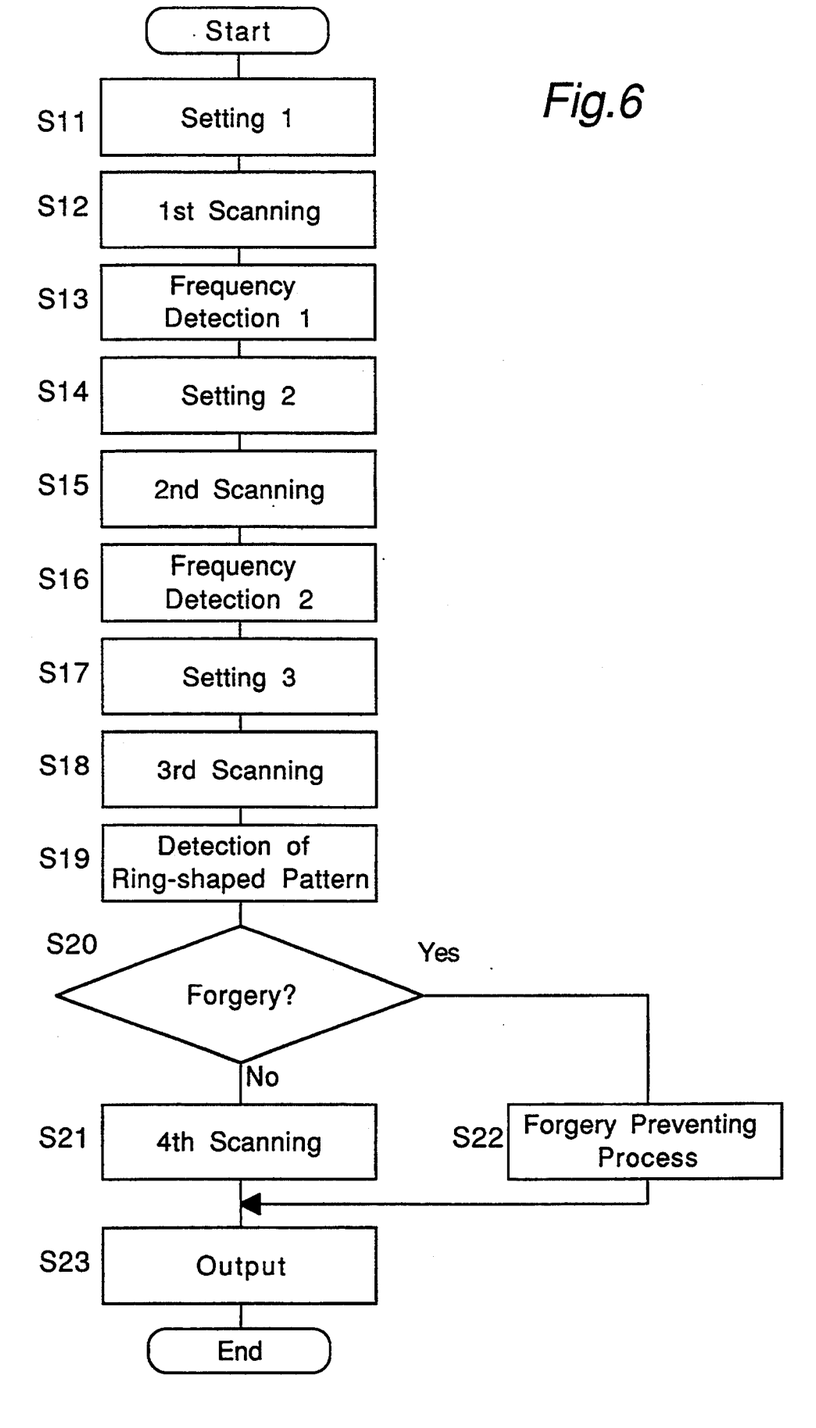
FIG. 6 is a flowchart showing the sequence of the image signal processing according to a first preferred embodiment of the present invention.

When the small area giving the high degree of similarity and the type of the standard pattern associated with the high degree of similarity are stored in the random access memory 381 during the first and second scanning, determination is made during the third scanning (S18) if a pattern having a curvature and a color both similar to those of the seal imprinted on the monetary paper exist in the above mentioned small area.

Hereinafter, a ring pattern detecting process (S19) to be performed during the third scanning and a forgery preventing process (S22) to be performed in the event of determination of a forgery will be described.

Respective signals outputted from CCD (R) 341, CCD (G) 342 and CCD (B) 343 are, during the third scanning, inputted to a window comparator 361. The window comparator 361 is operable to extract a color similar or identical with the color (vermilion) of the seal imprinted on the monetary paper as a specific color.

An image pattern representative of the vermilion color extracted by the window comparator 361 is supplied to a curvature calculating unit 391 by which the curvature is calculated. The calculated curvature is supplied to the central processing unit 370 to determine if the calculated curvature is equal to that of the ring-shaped perimeter of the seal imprinted on the monetary paper. The calculation of the curvature can be carried out on the basis of the position of at least three pixels extracted by the window comparator 361. It is, however, to be noted that, in consideration of noises, the three pixels used for the curvature calculation are selected from a portion that is extracted with the pixels continued in succession.

Should the central processing unit 370 determine (S20: Yes) that the curvature calculated in the manner described above matches with a predetermined curvature stored in the read-only memory 380 (that is, the calculated curvature is equal to that of the ring-shaped perimeter of the seal on the monetary paper), the central processing unit 370 supplies a data of the solid black image read out from the read-only memory 380 to a register 374 and, at the same time, issues a command to the data selector 348 to switch the data selector 348 over to a position ready to receive an output from the register 374. In other words, during the printing with the black toner material, the solid black image is printed on the copying paper thereby accomplishing the forgery prevention.

Second Embodiment (FIGS. 1 and FIGS. 10 to 12)

In the practice of a second preferred embodiment of the present invention, a two-dimension pattern matching technique is employed.

Mechanisms of the copying machine and general functions of the image processing both employed in the second preferred embodiment of the present invention are substantially identical with those shown and described in connection with the foregoing preferred embodiment of the present invention, and therefore, they are not reiterated for the sake of brevity. Instead, only what differs from the first embodiment of the present invention will be discussed.

Figure 10:
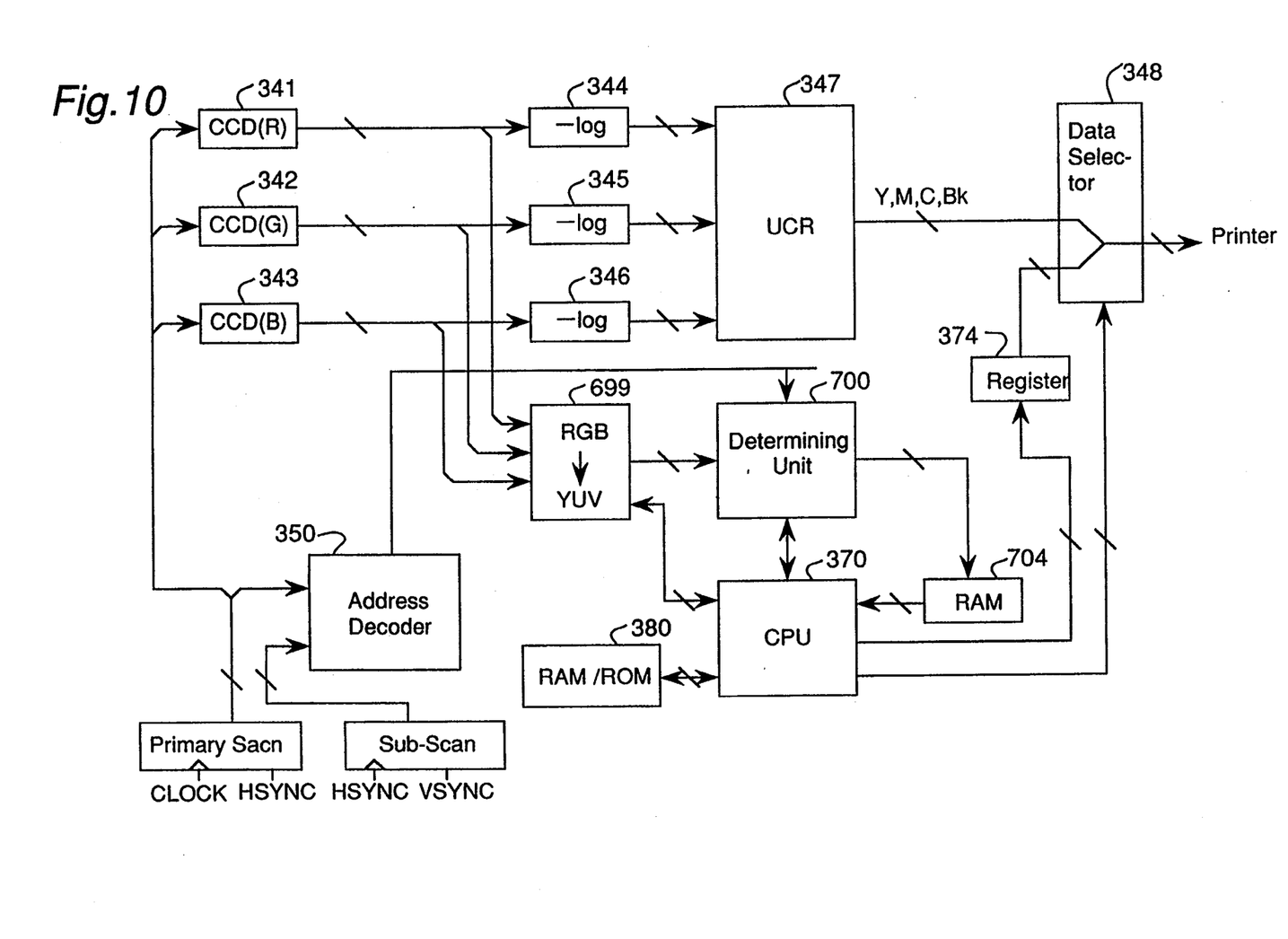
FIG. 10 is a circuit block diagram similar to FIG. 3, showing the image signal processing unit according to a second preferred embodiment of the present invention.

R, G and B data outputted respectively from CCD (R) 341, CCD (G) 342 and CCD (B) 343 are successively converted by a YUV converter 699 into Y (luminance/brightness), U (chromaticity) and V (chromaticity) data. In other words, during the first scanning they are converted into the Y data; during the second scanning they are converted into the U data; and during the third scanning they are converted into the V data. This YUV conversion is given by the following equation:

$$\begin{pmatrix} Y \\ U \\ V \end{pmatrix} = \begin{pmatrix} 0.299 & 0.587 & 0.114 \\ 0.596 & -0.274 & -0.322 \\ 0.211 & -0.523 & 0.312 \end{pmatrix} \begin{pmatrix} R \\ G \\ B \end{pmatrix}$$

Figure 11:
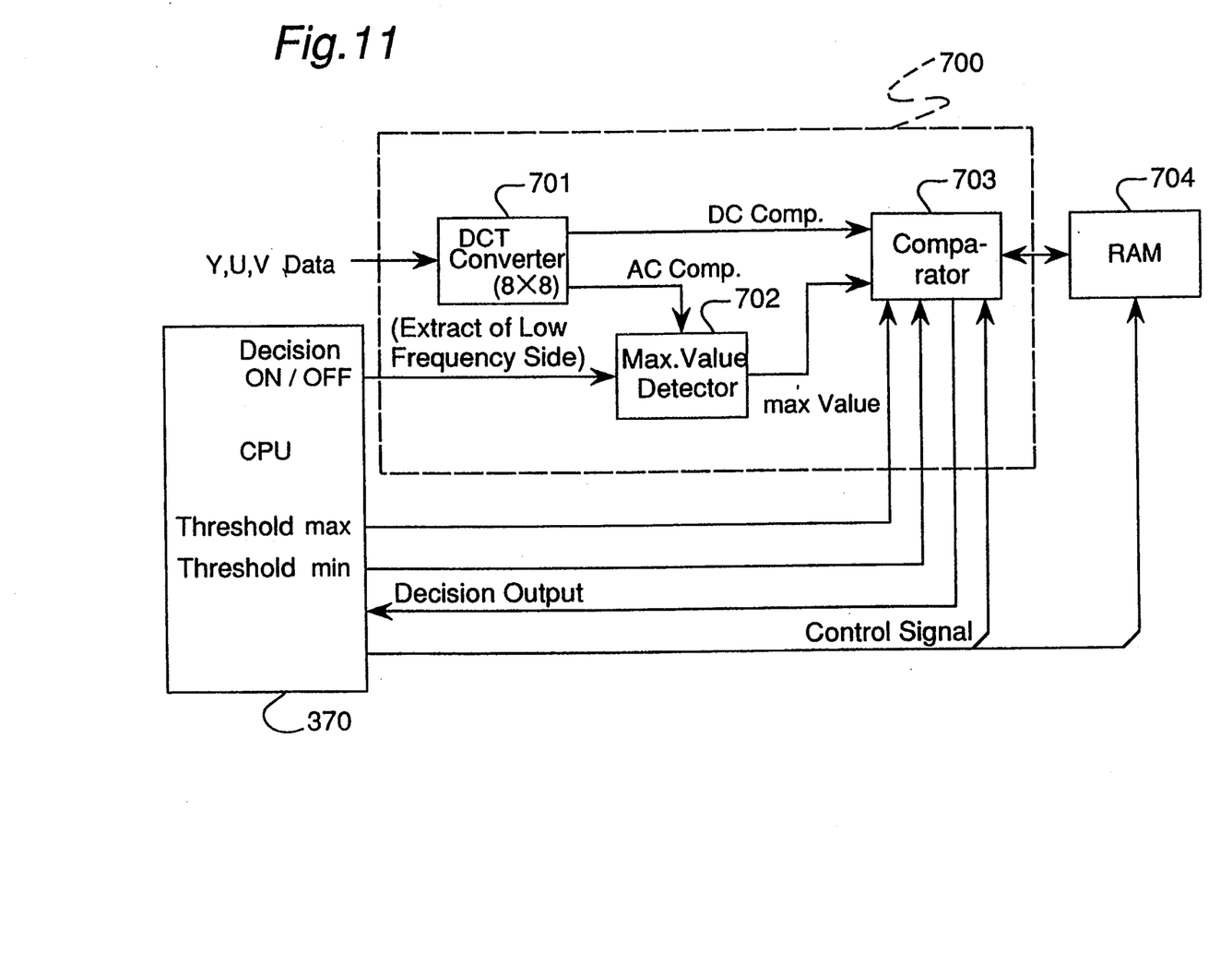
FIG. 11 is a circuit block diagram showing the details of a determining unit.

The data so converted are supplied to a discriminating unit 700 to discriminate them in two dimensions for each 8×8 pixels. In the discriminating unit 700, a DCT converter 701 performs a DCT (Discrete Cosine Transform) conversion for each 8×8 pixels.

Figure 12:
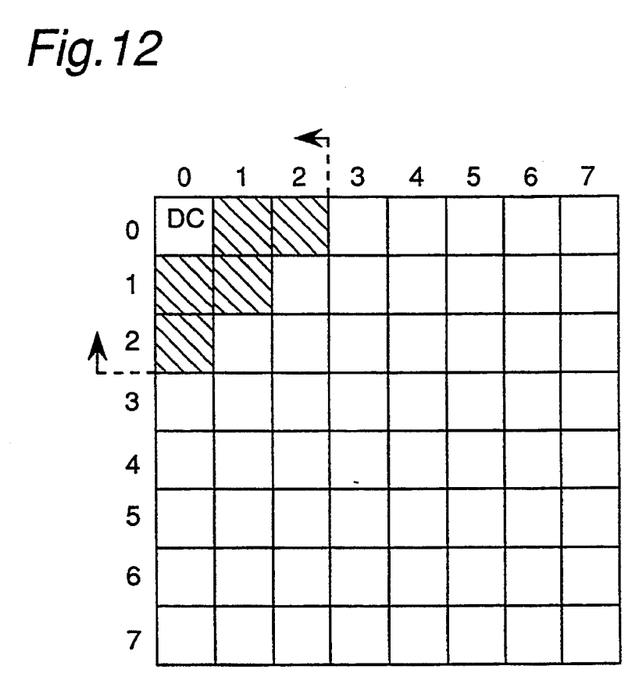
FIG. 12 is a diagram showing conversion coefficients to be compared after DCT conversion.

If the data is the Y data obtained during the first scanning, a DC component (Basic brightness of the original/Conversion coefficient at top left corner in FIG. 12) of the DCT-converted data is supplied to a comparator 703 so that a decision is made to determine if the DC component is of a brightness substantially equal to the basic brightness of the monetary paper given by the central processing unit 370. In other words, it is determined if the conversion coefficient $Y_{DC}$ falls within the range of $K_1$ and $K_2$ wherein $K_1$ and $K_2$ represent respective threshold values min and max.

Also, an AC component (spatial frequency of the tone of the original) is supplied to a maximum value detector 702, the maximum value of which is, after a low frequency side has been extracted by a decision ON signal, supplied to the comparator 703 by which a decision is made to determine if the maximum value is substantially equal to the "spatial frequency of the tone of the monetary paper" given by the central processing unit 370, that is, if the conversion coefficient $Y_{AC.max}$ falls within the range of $K_3$ and $K_4$ wherein $K_3$ and $K_4$ represent respective threshold values min and max.

Where results of decision indicate that the conversion coefficients $Y_{DC}$ and $Y_{AC.max}$ satisfy the respective conditions described above, a statement that the relevant pixel block has satisfied the conditions is written in the random access memory 704.

With respect to the U data obtained during the second scanning, a pixel block satisfying the above described conditions with respect to the Y data is first read out from the random access memory 704 and, then, a DC component (Basic brightness of U of the original/Conversion coefficient at top left corner in FIG. 12) is supplied to the comparator 703 by which a decision is made to determine if it is substantially equal to the "basic chromaticity of U of the monetary paper" given by the central processing unit 370, that is, if the conversion coefficient $U_{DC}$ falls within the range of $K_5$ and $K_6$ wherein $K_5$ and $K_6$ represent respective threshold values min and max.

Also, where a result of the decision performed by the comparator 703 indicates that the conversion coefficients $U_{DC}$ satisfies the above described condition, a statement that the relevant pixel block has satisfied the above described two conditions associated with Y and U is written in the random access memory 704.

Similarly, even in the case of the V data obtained during the third scanning, a process similar to that described in connection with the U data is performed. In other words, a pixel block satisfying the above described two conditions associated with the Y and U data is read out, and a DC component (Basic brightness of V of the original/Conversion coefficient at top left corner in FIG. 12) of the data of the relevant pixel block having been subjected to the DC conversion is supplied to the comparator 703 to determine if it is substantially equal to the "basic chromaticity of V of the monetary paper" given by the central processing unit 370, that is, if the conversion coefficient $V_{DC}$ falls within the range of $K_7$ and $K_8$ wherein $K_7$ and $K_8$ represent respective threshold values min and max.

Where a result of the decision performed by the comparator 703 indicates that the conversion coefficients $V_{DC}$ satisfies the above described condition, a statement that the relevant pixel block has satisfied the above described three conditions associated with Y, U and V is written in the random access memory 704.

Then, in the event that the pixel block satisfying the above described three conditions is generated exceeding a certain predetermined number of times, the central processing unit 370 supplies, in a manner similar to that described in connection with the first preferred embodiment of the present invention, an image data representative of the solid black image read out from the read-only memory 380 to the register 374 and, at the same time, supplies a command to the data selector 348 to cause the latter to be ready to receive the image data representative of the solid black image. In this way, the image data representative of the solid black image is outputted from the data selector 348 so that, during the printing with the black toner, the solid black image can be printed on the copying paper, thereby accomplishing the forgery prevention.

It is to be noted that, while in the second embodiment of the present invention only the DC component is compared so long as the U and V data are concerned, it is also possible to detect the spatial frequency of the chromaticity of any one of the U and V data by referring to an AC component of those data.

Other Embodiments

Although in describing any one of the first and second embodiments of the present invention, reference has been made to the monetary paper (issued by the Bank of Japan), the present invention cad be equally applicable to securities and/or monetary papers issued by a central bank of any other country, provided that the original providing the basis for the standard pattern has a unique spatial frequency as well.

Also, in describing any one of the first and second embodiments of the present invention, reference has been made to the use of an electrophotographic color copying machine. The present invention can, however, be embodied as an extra function that can be added to an image scanner or a printer. Moreover, in a device such as, for example, a color facsimile machine wherein an image of the original is divided according to the color and stores it as an image data, the device can be so structured that, while function of transmitting and receiving messages are interrupted, an attempt to transmit or receive an image of a monetary paper is informed to a particular number.

Thus, according to the present invention, the spatial frequency of a area of the original to be copied is detected by a detecting means, a pattern of distribution of which is compared with a standard pattern by a calculating means to determine the degree of similarity. Based on this degree of similarity, a decision is made to determine if the original to be copied is a monetary paper. Accordingly, even when the monetary paper is placed on the document support with a portion thereof concealed, or pieces of the monetary paper divided are separately placed on the document support, an accurate verification is possible to locate the nature of the document, that is, the monetary paper. Therefore, with the device of the present invention, it is possible to assuredly avoid any possible forgery of valuable papers.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An image processing machine which comprises:
   detecting means for detecting a spatial frequency of a small region of an original to be copied;
   calculating means for comparing the detected spatial frequency with a standard spatial frequency used as a standard pattern, thereby to calculate the degree of similarity therebetween;
   judging means for judging whether or not the degree of similarity so calculated is greater than a predetermined value; and
   determining means for determining, when the judging means indicates the degree of similarity greater than the predetermined value, that the original to be copied is identical with an original used as a basis for the standard pattern.

2. The image processing machine as claimed in claim 1, wherein said standard pattern is a pattern of fringes contained in a monetary paper.

3. The image processing machine as claimed in claim 1, further comprising image forming means for forming an image on the basis of an image of the original, and wherein an operation of the image forming means is inhibited when the original is deemed identical with an original providing a basis for the standard pattern.

4. The image processing machine as claimed in claim 1, further comprising image forming means for forming an image on the basis of an image of the original, and wherein an operation of the image forming means makes a solid black print when the original is deemed identical with an original providing a basis for the standard pattern.

* * * * *